United States Patent [19]
Hawryszkow

[11] Patent Number: 6,082,502
[45] Date of Patent: Jul. 4, 2000

[54] CABLE OPERATED PISTON TRAVEL INDICATOR

[75] Inventor: Michael G. Hawryszkow, Munster, Ind.

[73] Assignee: Westinghouse Air Brake Company, Wilmerding, Pa.

[21] Appl. No.: 09/135,779

[22] Filed: Aug. 18, 1998

[51] Int. Cl.$^7$ .................................................. F16D 66/00
[52] U.S. Cl. .............................. 188/1.11 R; 188/1.11 W
[58] Field of Search ...................... 188/1.11 W, 1.11 R, 188/33; 116/208, 270; 340/453; 92/5 R

[56] References Cited

U.S. PATENT DOCUMENTS

| | | | |
|---|---|---|---|
| 1,183,031 | 5/1916 | Price | 188/1.11 R |
| 1,391,895 | 9/1921 | Haskell . | |
| 3,691,982 | 9/1972 | Hawthorne . | |
| 4,596,311 | 6/1986 | Brodeur et al. | 188/1.11 W |
| 4,800,991 | 1/1989 | Miller | 188/1.11 R |
| 4,945,818 | 8/1990 | Ware | 92/5 R |
| 5,211,379 | 5/1993 | Porter | 188/1.11 R |
| 5,492,203 | 2/1996 | Krampitz | 92/5 R |
| 5,701,974 | 12/1997 | Kanju et al. | 188/1.11 R |
| 5,967,266 | 10/1999 | Carnegie | 188/1.11 L |
| 6,006,868 | 12/1999 | Klink | 188/1.11 W |

*Primary Examiner*—Douglas C. Butler
*Attorney, Agent, or Firm*—James Ray & Associates

[57] ABSTRACT

A cable operated piston travel indicator for readily viewing an amount of piston travel of a fluid actuated cylinder assembly positioned in a remote location is provided. The cable operated piston travel indicator of the invention is particularly applicable in the railway vehicle braking industry as an aid in performing pre-departure terminal tests of the air braking equipment of each car of the train. The cable operated piston travel indicator comprises an inner movable cable which is associated and movable with a piston. An outer shielding member encloses this inner movable cable and includes a clear cap with an indicating device thereon for viewing the movement of the inner cable member with respect to the indicating device. The end of the shielding member which includes the indication device thereon may be placed at a readily viewable location so that the amount of piston travel may be easily viewed at any time. The cable operated piston travel indicator of the present invention may be used in any environment wherein it is necessary to monitor the amount of piston travel and may be retrofitted onto currently used systems.

31 Claims, 4 Drawing Sheets

CABLE OPERATED PISTON TRAVEL INDICATOR

FIELD OF THE INVENTION

The present invention relates, in general, to a piston travel indicator and, more particularly, to a cable operated piston travel indicator which is located in an easily viewable location for readily determining piston travel and, still more particularly, to a cable piston travel indicator for railway vehicle brake assemblies, especially truck-mounted brake assemblies.

BACKGROUND OF THE INVENTION

Freight trains typically undergo a pre-departure terminal test in which the air brake equipment of each car is inspected prior to the train being cleared to proceed from the train make-up yard. This inspection requires a trainman to "walk the train" visually checking each car's brake equipment. Prior art type truck mounted brake assemblies include a piston travel indicator attached to the brake cylinder assembly for monitoring piston travel to determine whether or not the brake equipment is functioning properly.

The currently used piston travel indicator comprises an indicating means, such as a flag, which moves along a measuring means. This measuring means has an acceptable operating range or zone marked thereon. The inspector views the location of the flag with respect to the acceptable operating range to determine whether or not the braking equipment is functioning properly. For example, if the flag is below the range, then such would indicate that the slack adjuster trigger needs to be adjusted. If, on the other hand, the flag is above the range, such could indicate that either the slack adjuster is out of capacity and the brake shoes are too worn, or the slack adjuster is not functioning properly and requires maintenance.

Due to the location of this piston travel indicator within the truck mounted brake assembly underneath the car, it is often difficult for the trainman to readily view the indicator and to make a proper determination as to the functioning of the braking equipment. It thus becomes burdensome to inspect the braking equipment of the train and consequently more time consuming to complete the terminal test.

SUMMARY OF THE INVENTION

It is an object of the present invention to provide a cable operated piston travel indicator which is located in a readily viewable location for determining the amount of travel of a fluid activated piston.

It is a further object of the invention to provide a cable operated piston travel indicator which may be readily viewed by train inspection personnel so that such personnel may make a proper determination regarding the functioning of the train's braking equipment.

It is another object of the invention to position this cable operated piston travel indicator in a location on each car so that train inspection personnel may quickly perform a pre-departure terminal test.

It is yet another object of the invention to provide a cable operated piston travel indicator which may be mounted onto braking systems currently in use and is particularly applicable to truck-mounted brake assembly systems.

Briefly, and in accordance with the foregoing objects, the invention comprises a cable mechanism which includes an inner movable cable member and an outer shielding member which encloses and protects the inner movable member from detrimental environment and/or outside forces. One end of the inner movable cable member is attached to a brake cylinder assembly such that this movable member moves in accordance with movement of the piston. The outer shielding member includes a clear cap portion which allows one to view the opposite end of the inner movable cable member. The opposite end of this inner movable cable member can include a colored tip to assist in viewing it. The cap of the shielding member has an indicating means thereon which includes an acceptable operating range or zone for which the inner movable cable member should remain within. The portion of the cable mechanism which includes the indicating means is positioned in a location that may be readily viewed so that one may inspect the amount of piston travel at a given time and determine if this amount of piston travel is within the acceptable range.

The present invention is particularly applicable to the railway vehicle braking industry for inspecting the amount of piston travel of the brake cylinders on the cars to determine if the braking equipment is functioning properly. This invention would allow for the piston travel indicator to be moved out from under the car so that it can be easily seen by inspection personnel. In existing truck mounted braking systems, the inner movable cable member can be attached to the indicating means (flag) of the piston travel indicator presently on the air cylinder. In a new truck mounted brake system or other types of braking systems, the inner movable cable member can be attached to the push rod or any other component of the cylinder which moves in accordance with the piston. The outer shielding member is attached at a readily viewable location, such as the truck side frame or the train car body, so that it can be viewed while an inspector is walking the train.

More than one cable operated piston travel indicator can be mounted to the brake cylinder assembly. For example, two cable operated piston travel indicators can be mounted to the indicating means (flag) of a piston travel indicator of a cylinder assembly in a truck mounted braking system and an outer shielding member of each cable operated piston travel indicator can be mounted on each side of the truck so that the inspector can walk along either side of the train in order to perform the terminal pre-departure test.

Although a number of objects and advantages of the present invention have been described in some detail above, various additional objects and advantages of the cable operated piston travel indicator of the present invention will become more readily apparent to those persons who are skilled in the art from the following more detailed description of the invention, particularly, when such detailed description is taken in conjunction with both the attached drawing figures and with the appended claims.

DETAILED DESCRIPTION OF THE INVENTION

Figure 1:
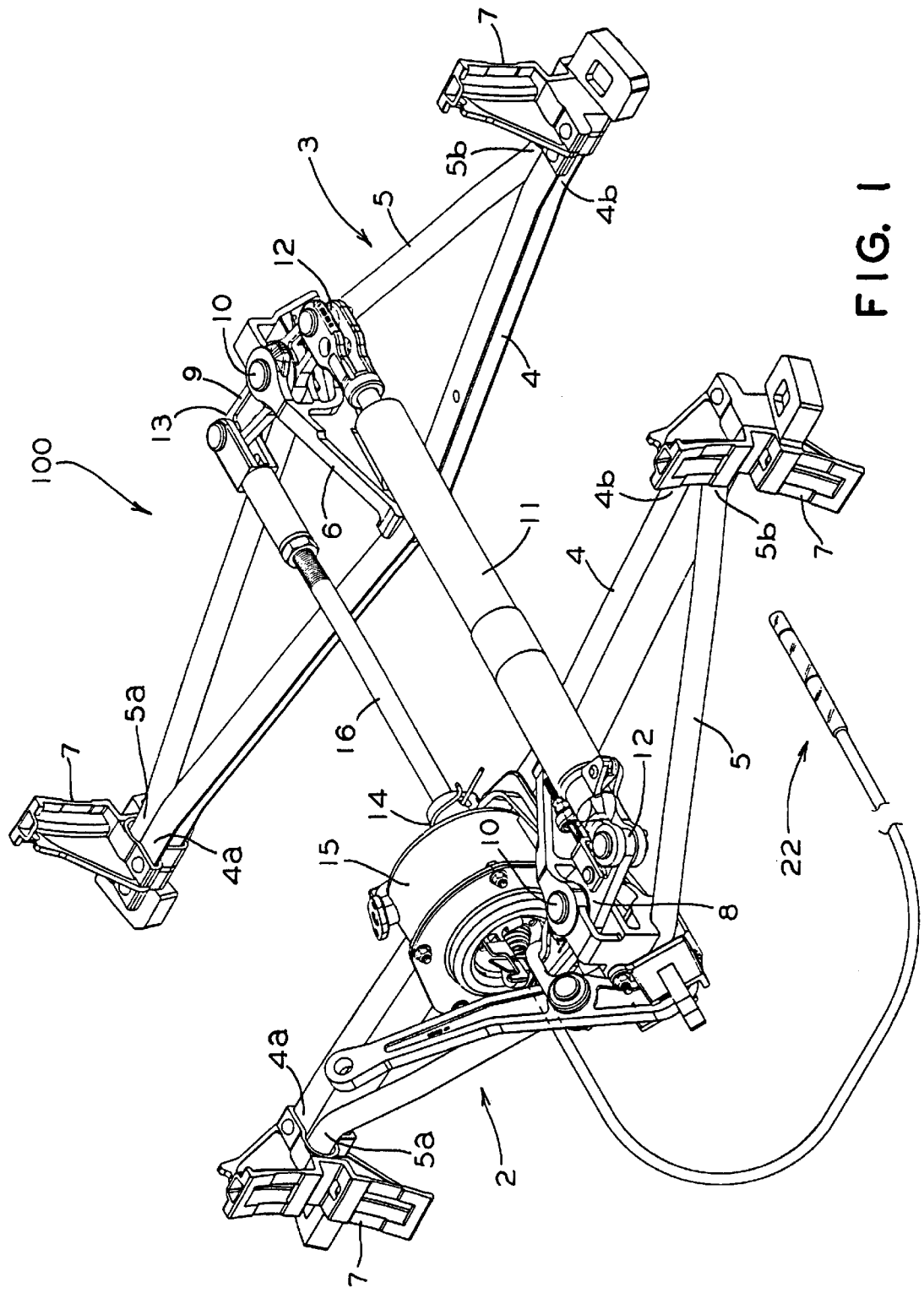
FIG. 1 is a plan view which shows a truck-mounted brake assembly with the cable operated piston travel indicator of the present invention attached to the existing piston travel indicator on the brake cylinder.

Referring to FIG. 1, there is shown a truck-mounted brake assembly, generally designated 100, for a railway car (not shown) having at least a portion of the cable operated piston travel indicator, generally designated 22, of the invention mounted thereon. This brake assembly 100 comprises brake beams, generally designated 2 and 3, which are substantially identical, each comprising a compression member 4, a tension member 5 and a strut member 6. The opposite ends of the compression member 4 and the tension member 5 may be permanently connected together, preferably by welding along an outer segment 4a–5a, 4b–5b at the opposite ends of the compression member 4 and the tension member 5. At a location midway between their opposite ends, the compression member 4 and the tension member 5 of the respective beams 2 and 3 are spaced apart sufficiently to allow connection of the strut member 6 therebetween. Mounted on the respective outer end segments 4a–5a, 4b–5b of the brake beams 2 and 3 are brake heads 7.

A pair of force-transfer levers 8 and 9 are pivotally connected by pins 10 to the strut member 6 of the respective brake beams 2 and 3. Each end 12 of the respective force-transfer levers 8 and 9 is interconnected via a force-transmitting member 11, which may be in the form of an automatic slack adjuster device. The opposite end 13 of the force-transfer lever 9 is connected to the pressure head 14 of the brake cylinder assembly 15 via a force-transmitting member or a return push rod assembly 16.

Figure 2:
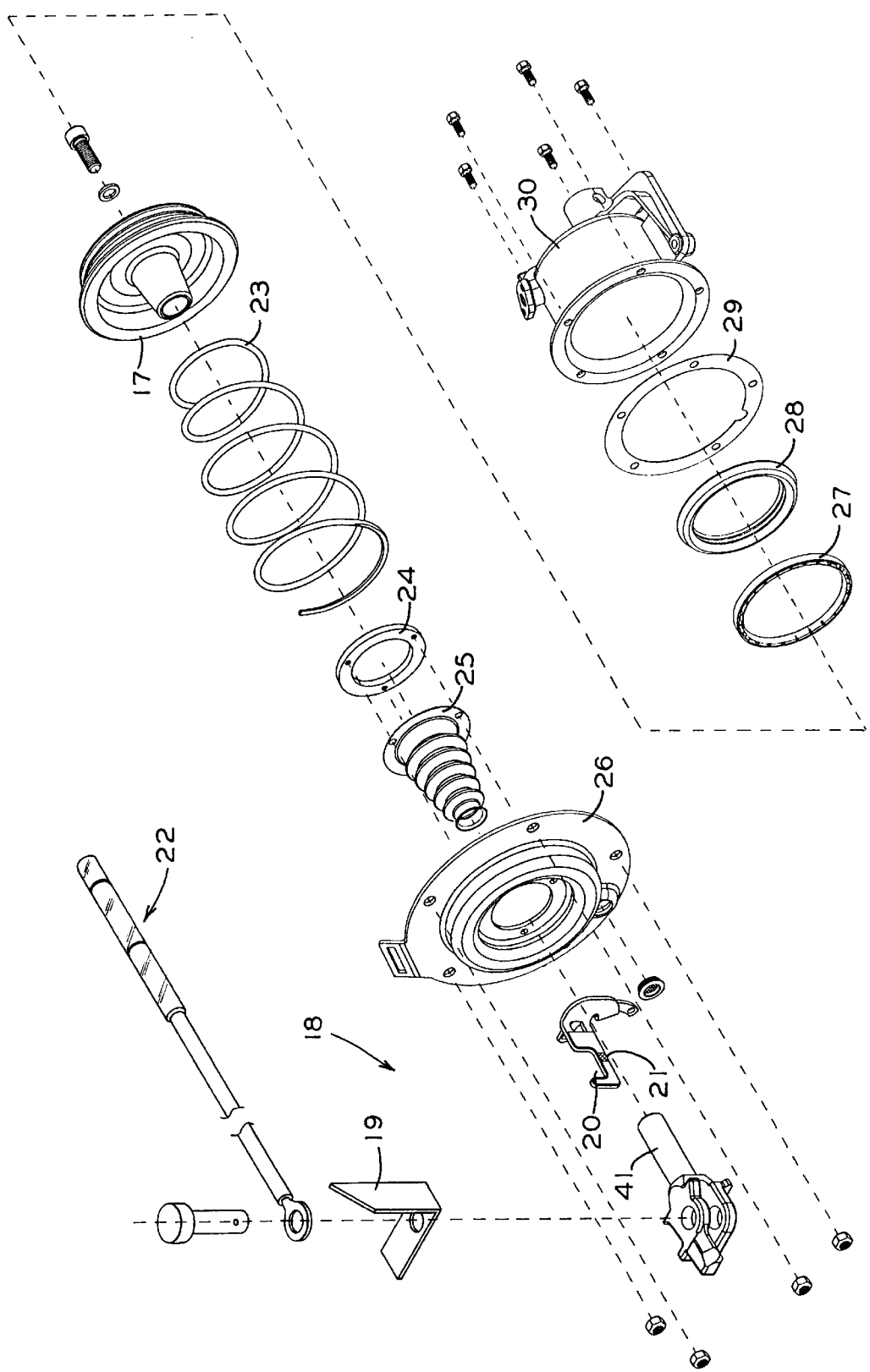
FIG. 2 is an expanded view of the brake cylinder of FIG. 1.

A piston rod 17, as shown in FIG. 2, of the brake cylinder assembly 15 is connected to the end of a push rod 41 which is in turn, connected to the force transfer lever 8. The brake cylinder assembly 15 is connected to the strut member 6 adjacent one side thereof and to the compression member 4 in the space between the compression member 4 and the tension member 5. The weight of the brake cylinder device and the force-transmitting members is thus carried by brake beams 2 and 3, which are, in turn, supported by the truck side frame (not shown).

As illustrated in FIG. 2, when a brake application is made, pressurization of the brake cylinder assembly 15 results in actuation of the brake cylinder piston rod 17. This actuation of the piston rod 17 causes the spring 23 to compress resulting in movement of the push rod 41 in a direction to effect counterclockwise rotation of force-transfer lever 8, as viewed in FIG. 1. The force-transfer lever 8, in turn, actuates the slack adjuster assembly 11 to effect counterclockwise rotation of the force-transfer lever 9 and consequent actuation of the return push rod assembly 16. The force-transfer levers 8, 9 along with the slack adjuster assembly 11, the return push rod assembly 16 and the brake cylinder assembly 15 comprise a brake beam actuating linkage that interconnects the brake beams 2 and 3 via pivot pins 10. The brake actuation force developed at the brake cylinder assembly 15 is transmitted to the brake beams 2 and 3 via pivot pins 10 and thus the brake actuation forces effectively act along these pins 10. The resultant of these forces is shown at X. Since the length of the slack adjuster assembly 11 increases with actuation of the brake cylinder push rod 41 during brake applications, it follows that brake beams 2 and 3 are moved apart by the brake beams linkage until the brake shoe engagement with the vehicle wheels occurs.

It is important in this type of braking system to visually monitor or inspect the amount the piston 17 moves during a braking operation in order to determine if the braking equipment is functioning properly. As illustrated in FIG. 2, a piston travel indicator, generally designated 18, is provided for this purpose. This piston travel indicator 18 comprises an indicating means 19, such as a flag, which is attached to the push rod 41. The push rod moves in accordance with movement of the piston 17 and causes the flag 19 to move along a measuring means 20. This measuring means 20 has an acceptable operating range or zone 21 marked thereon. The currently used systems require the inspector to view the location of the flag 19 with respect to the acceptable operating range 21 to determine whether or not the braking equipment is functioning properly. For example, if the flag 19 is below the range 21, then such would indicate that the slack adjuster trigger needs to be adjusted. If, on the other hand, the flag 19 is above the range 21, such could indicate that either the slack adjuster 11 is out of capacity and the brake shoes are too worn, or the slack adjuster 11 is not functioning properly and requires maintenance. Due to the location of this piston travel indicator 18 underneath the car, it is often difficult and burdensome for the train inspector to readily view the indicator 18 and to make a proper determination as to the functioning of the braking equipment.

The present invention overcomes this disadvantage by providing a cable operated piston travel indicator 22 which allows the piston travel indicator to be moved out from underneath the car, where it is difficult to view, and to be placed in a readily viewable location such as attached to the truck side frame (not shown). FIG. 2 shows an expanded view of a typical brake cylinder assembly 15 including a piston travel indicator 18 having the cable operated piston travel indicator 22 of the present invention attached thereto. This cable operated piston travel indicator 22 may be attached to the piston travel indicator 18 by any well known means, such as by means of molded plastic or a stamped metal clip.

This brake cylinder assembly 15 comprises well known components such as the piston rod 17, the return spring 23, the dust boot retainer 24 and the dust boot 25. Also included in the brake cylinder assembly 15 are the piston guide ring 27, the packing cup 28 and the cylinder gasket 29. These components are enclosed within the cylinder casing 30 and the non-pressure head 26. The piston travel indicator 18 is associated with the push rod 41 and moves in accordance therewith. The cable operated piston travel indicator 22 of the present invention is associated with the piston travel indicator 18 and the indicating means (flag) 19 in a manner, as discussed in detail below, so as to indicate in a readily viewable location the amount of piston travel in the brake cylinder.

Figure 4:
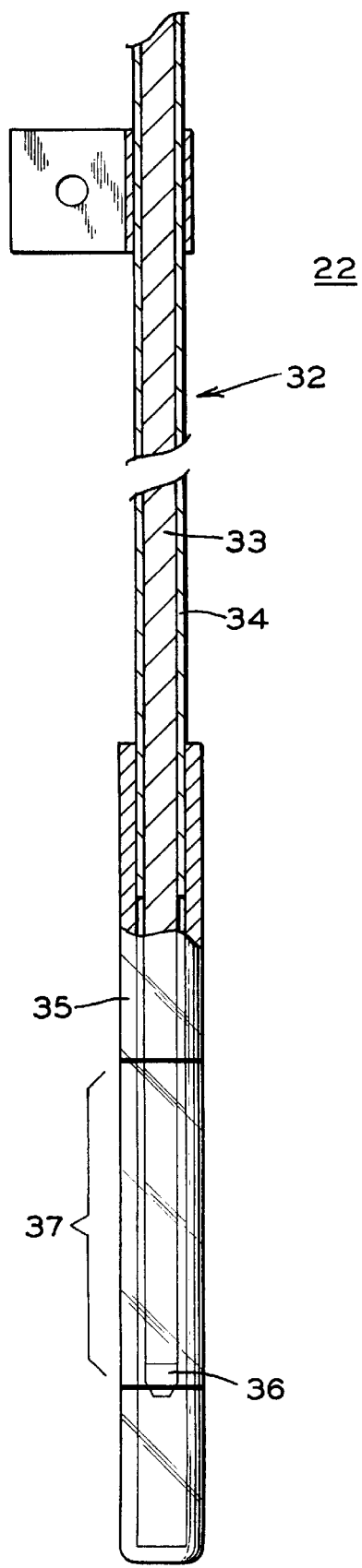
FIG. 4 is an enlarged view partially in cross section which illustrates the indicating portion of the cable operated piston travel indicator of the invention.

As illustrated in FIG. 4, the cable operated piston travel indicator 22 of the present invention comprises cable mechanism 32 which comprises an inner movable cable member 33, such as a ⅛" monofilament shaft, and an outer shielding member 34 which encloses and protects the inner movable member 33 from detrimental environmental and/or outside forces. One end of the inner movable cable member 33 is attached to the brake cylinder assembly in a location that allows for movement in accordance with movement of the piston rod 17. This location could include the push rod 41, an indicating means (flag) 19 of the piston travel indicator 18, or even the piston rod 17. The outer shielding member 34 can be attached to the piston travel indicator 18 or any other stationary component within the brake assembly. The outer shielding member 34 includes a clear plastic cap 35, which may be attached to the outer shielding member 34 by any well known means, such as mechanically or with an epoxy adhesive. This clear cap 35 allows one to view the opposite end of the inner movable cable member 33. The opposite end of this inner movable cable member 33 can include a colored tip 36 to assist in viewing it. The cap 35 of the shielding member has an indicating means thereon or therein which includes an acceptable operating range or zone 37 for which the colored tip 36 of the internal movable cable member 33 should remain within. The indicating means or acceptable operating zone 37 can be in the form of markings directly on the clear cap or by the placement of an indicating means or measuring means within the cap. The portion of the cable mechanism 32 which includes the indicating means is positioned in a location that may be readily viewed so that one may inspect the amount of piston travel at a given time and determine if this amount of travel is within the acceptable range 37. For example, depending upon the environment for which the present invention is being used, the indicating portion of the cable mechanism could be attached to the truck side frame or to the side of the train car itself.

Additionally, more than one cable operated piston travel indicator 22 can be mounted to the brake cylinder assembly 15. For example, two cable operated piston travel indicators 22 can be mounted to a piston travel indicator 18 and the indicting means (flag) 19 in a truck mounted braking system and an outer shielding member of each cable operated piston travel indicator can be mounted on each side of the truck so that the inspector could walk along either side of the train in order to perform the terminal pre-departure test.

Figure 3:
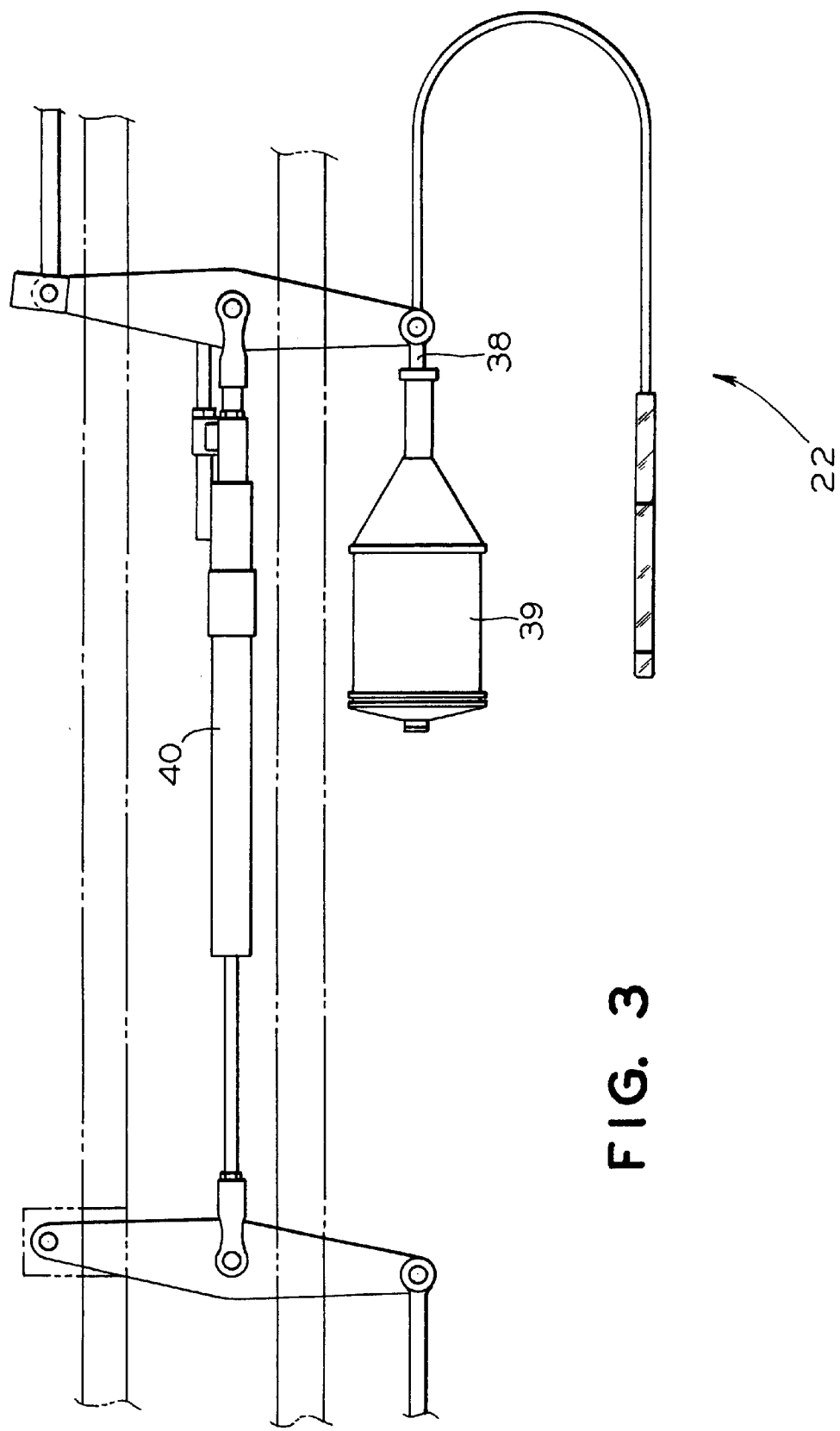
FIG. 3 is a partial plan view illustrating a brake rigging having a slack adjuster for a brake gear and in which the cable operated piston travel indicator of the invention is attached to the push rod of the brake cylinder.

FIG. 3 shows an embodiment wherein the cable operated piston travel indicator 22 of the present invention is attached directly to the return rod 38 on a brake cylinder 39 of a typical center rod brake gear application which includes a slack adjuster mechanism 40. As can be seen in this embodiment, the cable operated piston travel indicator of the present invention may be used to monitor the amount of piston travel in other types of braking systems. Additionally, all truck mounted braking systems can be retrofitted to accept this invention or obvious modifications thereof. The present invention is further applicable to environments other than train braking systems wherein it is necessary to monitor the amount of piston travel such as environments which require the use of hydraulic or pneumatic cylinders.

Thus, the present invention has been described in such full, clear, concise and exact terms as to enable any person skilled in the art to which it pertains to make and use the same. It will be understood that variations, modification, equivalents and substitutions for components of the specifically described embodiments of the invention may be made by those skilled in the art without departing from the spirit and scope of the invention as set forth in the appended claims.

I claim:

1. A cable operated piston travel indicator for monitoring an amount of piston travel in a brake cylinder assembly for a railroad vehicle, said cable operated piston travel indicator comprising:
   (a) a cable mechanism, said cable mechanism including;
      (i) an inner movable cable member, said inner movable cable member having a first end and a second end opposite from said first end, said first end of said inner movable cable member being associated with said piston such that said inner movable cable member moves along with movement of said piston, and
      (ii) an outer shielding member for enclosing and protecting said inner movable cable member, said outer shielding member having an end disposed at a predetermined location remote from said first end of said inner movable cable member for enclosing said second end of said inner movable cable member;
   (b) a clear cap disposed at said end of said outer shielding member remote from said first end of said inner movable cable member for viewing said second end of said inner movable cable member; and
   (c) an indicating means disposed at least one of on and in said clear cap for indicating an amount of travel of said second end of said inner movable cable member with respect to said indicating means so as to determine the amount of travel of said piston in said brake cylinder assembly.

2. A cable operated piston travel indicator as recited in claim 1 wherein said end of said outer shielding member remote from said first end of said inner movable cable member is attached to a truck side frame.

3. A cable operated piston travel indicator as recited in claim 1 wherein said second end of said inner movable cable member includes a colored tip.

4. A cable operated piston travel indicator as recited in claim 1 wherein said indicating means on said clear cap comprises markings on said cap.

5. A cable operated piston travel indicator as recited in claim 4 wherein said markings depict an acceptable operating range of approximately 2" of which said second end of said inner movable cable member should remain within during a braking operation.

6. A cable operated piston travel indicator as recited in claim 1 wherein said inner movable cable member comprises a ⅛" monofilament line.

7. A cable operated piston travel indicator as recited in claim 1 wherein said clear cap comprises a separate plastic member attached to said outer shielding member.

8. A cable operated piston travel indicator as recited in claim 1 wherein said brake cylinder assembly has mounted thereon a piston travel indicator having an associated piston travel indicating means and said first end of said inner movable cable member is attached to said piston travel indicating means of said brake cylinder assembly mounted piston travel indicator.

9. A cable operated piston travel indicator as recited in claim 8 wherein said outer shielding member includes an end opposite from said end having said clear cap disposed thereon and said opposite end of said outer shielding member is attached to said brake cylinder assembly mounted piston travel indicator.

10. A viewable cable operated piston travel indicator for monitoring an amount of piston travel of a fluid actuated cylinder assembly wherein said fluid actuated cylinder assembly is mounted remotely from a predetermined viewing area, said cable operated piston travel indicator comprising:
   (a) a cable mechanism, said cable mechanism including;
      (i) an inner movable cable member, said inner movable cable member having a first end and a second end opposite from said first end, said first end of said inner movable cable member being associated with said piston such that said inner movable cable member moves along with movement of said piston; and
      (ii) an outer shielding member for enclosing and protecting said inner movable cable member, said outer shielding member having an end disposed at a predetermined location remote from said first end of said inner movable cable member for enclosing said second end of said inner movable cable member, said end of said outer shielding member being located in said predetermined viewing area;
   (b) a clear cap disposed at said end of said outer shielding member remote from said first end of said inner movable cable member for viewing said second end of said inner movable cable member; and (c) an indicating means disposed at least one of on and in said clear cap for indicating an amount of travel of said second end of said inner movable cable member with respect to said indicating means so as to provide a viewable indication of the amount of travel of said piston of said remotely mounted fluid actuated cylinder assembly.

11. A viewable cable operated piston travel indicator as recited in claim 10 wherein said end of said outer shielding member remote from said first end of said inner movable cable member is attached to a truck side frame of a train.

12. A viewable cable operated piston travel indicator as recited in claim 10 wherein said second end of said inner movable cable member includes a colored tip.

13. A viewable cable operated piston travel indicator as recited in claim 10 wherein said indicating means comprises markings on said cap.

14. A viewable cable operated piston travel indicator as recited in claim 13 wherein said markings depict an acceptable operating range of approximately 2" of which said second end of said inner movable cable member should remain within during a braking operation.

15. A viewable cable operated piston travel indicator as recited in claim 10 wherein said inner movable cable member comprises a ⅛" monofilament line.

16. A viewable cable operated piston travel indicator as recited in claim 10 wherein said clear cap comprises a separate plastic member attached to said outer shielding member.

17. A viewable cable operated piston travel indicator for monitoring an amount of piston travel in a brake cylinder assembly for a railroad vehicle, said brake cylinder assembly including a piston and a piston travel indicator with a first piston travel indicating means mounted on said brake cylinder assembly wherein said piston travel indicator with said first piston travel indicating means is mounted remotely from a predetermined viewing area, said piston travel indicator and said first piston travel indicating means being capable of monitoring an amount of piston travel during braking, said cable operated piston travel indicator comprising:

(a) a cable mechanism, said cable mechanism including;
  (i) an inner movable cable member, said inner movable cable member having a first end and a second end opposite from said first end, said first end of said inner movable cable member being associated with said first piston travel indicating means such that said inner movable cable member moves along with movement of said first piston travel indicating means; and
  (ii) an outer shielding member for enclosing and protecting said inner movable cable member, said outer shielding member having an end disposed at a predetermined location remote from said first end of said inner movable cable member for enclosing said second end of said inner movable cable member;

(b) a clear cap disposed at said end of said outer shielding member remote from said first end of said inner movable cable member for viewing said second end of said inner movable cable member; and (c) a second indicating means disposed at least one of on and in said clear cap for indicating an amount of travel of said second end of said inner movable cable member with respect to said second indicating means so as to provide a viewable indication of the amount of travel of said piston in said brake cylinder assembly.

18. A viewable cable operated piston travel indicator as recited in claim 17 wherein said end of said outer shielding member remote from said first end of said inner movable cable member is attached to a truck side frame of a train.

19. A viewable cable operated piston travel indicator as recited in claim 17 wherein said second end of said inner movable cable member includes a colored tip.

20. A viewable cable operated piston travel indicator as recited in claim 17 wherein said second indicating means comprises markings on said cap.

21. A viewable cable operated piston travel indicator as recited in claim 20 wherein said markings depict an acceptable operating range of approximately 2" of which said second end of said inner movable cable member should remain within during a braking operation.

22. A viewable cable operated piston travel indicator as recited in claim 17 wherein said inner movable cable member comprises a ⅛" monofilament line.

23. A viewable cable operated piston travel indicator as recited in claim 17 wherein said clear cap comprises a separate plastic member attached to said outer shielding member.

24. A viewable cable operated piston travel indicator as recited in claim 17 wherein said outer shielding member includes an end opposite from said end having said clear cap disposed thereon and said opposite end of said outer shielding member is attached to said remotely mounted piston travel indicator.

25. A method of retrofitting a truck mounted brake assembly on a railroad car with a cable operated brake cylinder piston travel indicator, said truck mounted brake assembly including a brake cylinder assembly having a piston and a piston travel indicator with a first piston travel indicating means mounted on such brake cylinder assembly, said piston travel indicator and said first piston travel indicating means being capable of monitoring an amount of piston travel during braking, said method comprising the steps of;

(a) providing a cable mechanism including:
  (i) an inner movable cable member, said inner movable cable member having a first end and a second end opposite from said first end;
  (ii) an outer shielding member for enclosing and protecting said inner movable cable member, said outer shielding member having an end disposed at a predetermined location remote from said first end of said inner movable cable member for enclosing said second end of said inner movable cable member;
  (iii) a clear cap disposed at said end of said outer shielding member remote from said first end of said inner movable cable member for viewing said second end of said inner movable cable member; and
  (iv) a second indicating means disposed at least one of on and in said clear cap for indicating an amount of travel of said second end of said inner movable cable member with respect to said second indicating means;

(b) attaching said first end of said inner movable cable member to said first piston travel indicating means such that said inner movable cable member moves along with movement of said first piston travel indicating means; and (c) placing said end of said outer shielding member having said clear cap disposed thereon at a viewable location to allow for monitoring of the amount of travel of said piston on said brake cylinder assembly during a braking operation.

26. A method of retrofitting a truck mounted brake assembly on a railroad car with a cable operated brake cylinder piston travel indicator as recited in claim 25 including the step of attaching an opposite end of said outer shielding member to said piston travel indicator mounted on such brake cylinder assembly.

27. A method of retrofitting a truck mounted brake assembly on a railroad car with a cable operated brake cylinder piston travel indicator as recited in claim 25 including the step of providing at least two cable mechanisms wherein the first end of the inner movable cable member of each of said at least two cable mechanisms is attached to said first piston travel indicating means and the end of the outer shielding member having said clear cap disposed thereon of each of said at least two cable mechanisms is attached to opposite sides of a truck side frame.

28. A method of retrofitting a truck mounted brake assembly on a railroad car with a cable operated brake cylinder piston travel indicator as recited in claim 25 including providing said second end of said inner movable cable member with a colored tip.

29. A method of retrofitting a truck mounted brake assembly on a railroad car with a cable operated brake cylinder piston travel indicator as recited in claim 25 including providing markings on said clear cap indicating an acceptable operating range of approximately 2" for which said second end of said inner movable cable member should remain within during a braking operation.

30. A method of retrofitting a truck mounted brake assembly on a railroad car with a cable operated brake cylinder piston travel indicator as recited in claim 25 wherein said inner movable cable member comprises a $\frac{1}{8}$" monofilament line.

31. A method of retrofitting a truck mounted brake assembly on a railroad car with a cable operated brake cylinder piston travel indicator as recited in claim 25 wherein said clear cap comprises a separate plastic member attached to said outer shielding member.

* * * * *